United States Patent
Sandstrom

[15] 3,653,998
[45] Apr. 4, 1972

[54] ELECTROLYTIC CELL ETCHING

[72] Inventor: James P. Sandstrom, Marina Del Rey, Calif.

[73] Assignee: The Bissett-Berman Corporation, Santa Monica, Calif.

[22] Filed: Aug. 21, 1968

[21] Appl. No.: 754,277

[52] U.S. Cl. ................................. 156/6, 156/2, 204/292, 204/15
[51] Int. Cl. .......................................... C23f 1/04, H05k 3/06
[58] Field of Search ................... 134/2, 19, 20; 156/2, 4, 6; 204/15, 292

[56] References Cited

UNITED STATES PATENTS 3,420,711   1/1969   Van Driesen ........................... 134/2

Primary Examiner—Jacob H. Steinberg
Attorney—Smyth, Roston & Pavitt

[57] ABSTRACT

The present invention relates to the manufacture of electrolytic cells. Specifically, the invention relates to the manufacture of electrolytic cells which do not prematurely short out and which do not provide false readings upon a readout of the information stored in the cell. The electrolytic cells include an inner conductor which is plated with an active material and wherein the active material is plated on the inner conductor using a waterless plating solution and wherein the actual plating occurs at a temperature substantially lower than room temperature, for example, 5° ± 5° C. The waterless plating solution can be a solution of silver nitrate in dimethylsulfoxide. The invention also includes the use of an outer cup electrode which receives the inner electrode and wherein the outer cup electrode is treated to remove strain within the cup electrode. The treatment by thermally etching the cup electrode to remove the strain and at the same time eliminate surface contaminations. As a final step to the construction of the electrolytic cell and after the inner electrode is sealed across an open end of the cup electrode the electrolytic cell is subjected to an elevated temperature substantially above room temperature so as to cure the electrolytic cell and create a condition of equilibrium within the electrolytic cell.

5 Claims, 3 Drawing Figures

Patented April 4, 1972

3,653,998

INVENTOR:
James P. Sandstrom

ATTORNEYS

ELECTROLYTIC CELL ETCHING

The present invention is directed to the construction of an electrolytic cell. An electrolytic cell may generally be defined as including a pair of electrodes both in contact with an electrolyte and with an active material for transfer between the electrodes. The specific type of electrolytic cell constructed in accordance with the teachings of this invention include an outer cup-shaped electrode which is composed of an active material such as silver. An electrolyte is disposed within the cup-shaped outer electrode. An inner electrode extends within the outer electrode and is sealed across the open end of the cup-shaped outer electrode. The inner electrode includes at least a layer of an inert material such as gold, which layer of inert material may be used as a base to receive a layer of the active material. It is to be appreciated that materials other than silver and gold may be used.

The electrolytic cell constructed in accordance with the teachings of the present invention may be used as an accumulator wherein a current is passed through the electrolytic cell so as to transfer active material from the outer cup-shaped electrode to be deposited on the inner electrode. The electrolytic cell, therefore, accumulates and stores information in accordance with the quantity of active material which is transferred. This stored information may be read out by re-transferring the active material from the inner electrode back to the outer electrode.

The electrolytic cell constructed in accordance with the teachings of the present invention may also be used as a timing device wherein the inner electrode is preplated with a particular amount of active material, which preplating occurs prior to the assembly of the inner electrode and the outer electrode into an electrolytic cell. A predetermined current may then be applied to the completed electrolytic cell to transfer the active material preplated on the inner electrode to the outer electrode and the period of time is determined by the value of the current and the amount of active material which is preplated on the inner electrode. At the time when all of the active material is removed from the inner electrode and transferred to the outer electrode, a rise in voltage across the electrolytic cell occurs since the impedance of the electrolytic cell changes rapidly when all of the active material is removed from the inner electrode.

In order to provide for an accurate accumulation or timing, the electrolytic cell must be very precisely made so as to eliminate potential errors in the transfer of the active material. One problem, for example, which has arisen is that the electrolytic cells may short out when stored for a long period of time or may short out during operation. When these shorted-out electrolytic cells are examined, it is noted that silver deposits appear to build up at particular locations on the cup-shaped outer electrode, which build up eventually extends to the inner electrode and thereby provides for a shorting out of the electrolytic cell. As indicated above, this occurs even when the electrolytic cell is merely stored and when no current is applied to the electrolytic cell.

Another problem which has arisen in the use of the electrolytic cells for timing is that during the timing out of the electrolytic cell a premature output signal occurs before all of the active material is actually removed from the inner electrode and deposited on the outer electrode. It is desirable that the active material on the inner electrode be uniformly removed from the inner electrode for deposition on the outer electrode but it appears that sometimes large portions of the active material fall off of the inner electrode, thereby providing for these false output readings.

Another problem which arises in the construction of the electrolytic cells is that some voltage appears to exist across the electrolytic cell after construction, thereby providing for transfer of active material, if there is an external current path, without the use of an external current source. It is, therefore, desirable to provide for the construction of electrolytic cells which eliminates these various problems listed above so as to provide for an electrolytic cell which may be accurately used as an accumulator or as a timing device.

As indicated above, because of a buildup of the active material at certain locations in the silver cups, this built-up active material could ultimately cause a shorting out of the electrolytic cells. Also, if the outer cup electrode contains these built-up areas and when the inner electrode is deplated, the active material would tend to deplate to these built-up areas to form needles which would ultimately short out the electrolytic cell during the deplating operation.

It would appear that there are several problems involved in the construction of the outer cup electrode which cause this short circuiting of the electrolytic cell. For example, when the cup electrode is initially formed, strain is present in the cup, especially at points where the metal is bent at a substantial angle. When the electrolyte is in contact with the outer cup electrode, ions go into and out of the electrolytic solution constantly. The metal tends to go to its lowest energy configuration, so as the ions go into and out of solution, the metal is redistributed in its lowest energy configuration. Therefore, crystals are formed at these areas of greatest strain. If the strain in the cup-shaped electrode is sufficiently great, the crystals may build up to form needles which ultimately short out the cell. However, a more important problem is that when the inner electrode is deplated during the normal operation of the electrolytic cell, the active material from the inner electrode tends to deplate to those already formed crystals. Needles build up on the crystals which ultimately short out the electrolytic cell prior to the deplating of all of the active material from the inner electrode.

Another problem in the manufacture of the cup-shaped electrodes is that during the manufacture the surface of the cup-shaped electrode becomes contaminated, which contamination causes the surface energy to be different at different locations in the cup-shaped electrode. This variation in surface energy also causes crystals to be built up, which in turn may ultimately cause the electrolytic cell to be shorted out. It is, therefore, desirable to eliminate these surface contaminations and also to eliminate the strain in the metal. The present invention provides for an elimination of the strain and surface contaminations by a thermal etch.

It would be possible to eliminate the strain by merely annealing the metal, but this would not eliminate the surface contamination. Also, it would be possible to eliminate the surface contamination by etching the surface of the cup-shaped electrode, but this would not eliminate the internal strain. The present invention provides for raising the temperature of the cup-shaped electrode sufficiently to relieve the strains and at the same time directing a stream of gas, for example, oxygen against the cup-shaped electrode, which stream of gas provides for an etching of the surface of the cup-shaped electrode, which etching removes the surface contaminations. The present invention, therefore, provides for a combination of annealing and etching using this thermal etching technique. It is desirable during the thermal etching to use a gas containing oxygen so as to oxidize anything on the surface, which oxidized material would be volatized off due to the high temperature during the thermal etch. However, it is to be appreciated that other gases may be used during the thermal etch.

In the construction of the inner electrode, which inner electrode may be alternatively referred to as an anode, and especially in the construction of an anode containing a preplated portion of active material, it is desirable that the active material be uniformly plated onto the inner electrode so that the active material may be uniformly deplated from the inner electrode to the outer electrode when the inner-outer electrodes are assembled into an electrolytic cell. It has been found that prior techniques of plating did not provide for such a uniform plating in that the active material was plated with large crystal structures which were not mechanically secure. During deplating, large portions of the active material would be undercut and these large portions would fall off of the inner electrode to provide for false output readings.

The present invention provides for the plating of the inner electrode using a plating solution which is maintained substantially below room temperature. It has been found that plating at this cold temperature provides for a much more uniform plating of the active material. The plating at a cold temperature also provides for a small crystal structure of the active material on the anode, which plating is mechanically secure and may be very accurately deplated. It has also been determined that the plating is accomplished in a very accurate and mechanically secure fashion when the plating solution is waterless and, as a specific example of a plating solution for the plating of silver, it has been found that a plating solution of silver nitrate dissolved in dimethylsulfoxide provides for a very excellent plating of silver onto the inner electrode.

When the temperature is raised to room temperature, it has been found that the crystal size of the active material is significantly larger than when the temperature is lowered. Also, if water is added to the plating solution, it has been found also that the size of the crystals of active material plated on the inner electrode is significantly enlarged. Therefore, the provision of the plating using a waterless plating solution and using a low temperature provides for a very accurate and fine plating of the active material on the inner electrode.

It has also been determined that when the inner and outer electrodes are assembled into the electrolytic cell there appears to be a voltage difference between the inner and outer electrodes which may cause a transfer of active material if there is an external current path. This transfer, of course, can provide for inaccuracy in a later use of the electrolytic cell. The present invention, therefore, provides for inaccuracy in a later use of the electrolytic cell. The present invention, therefore, provides a technique where the electrolytic cells are cured at an elevated temperature for a substantial length of time so as to bring the electrolytic cell into equilibrium, thereby preventing any improper transfer of active material.

Specifically, as the temperature of the curing is increased, the time for curing is reduced and, as an example, the electrolytic cell would be maintained for a fairly long period of time, such as 36 hours, if the curing temperature is 70° C. One unique way of providing for the cure and at the same time steam cleaning the electrolytic cell is to direct steam toward the electrolytic cell for a period of time such as 1 hour, which period of time is sufficient to cure the electrolytic cell and at the same time provide for a thorough cleaning of the electrolytic cell. The steam cleaning also provides for the removal of any electrolyte which may leach out of the electrolytic cell during the curing process.

An electrolytic cell, which is constructed in accordance with the above teachings, is highly accurate and provides for a very reliable transfer of active material. A clearer understanding of the invention will be had with reference to the following description and drawings wherein.

Figure 1:
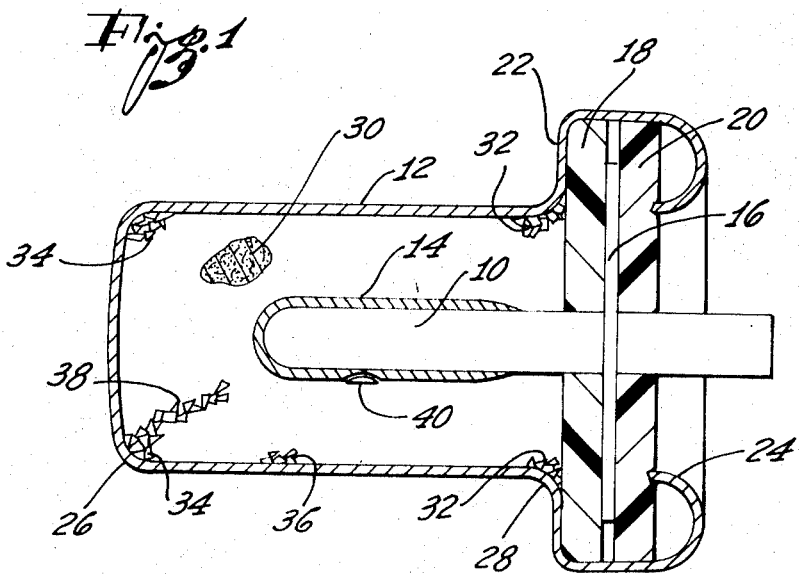
FIG. 1 illustrates an electrolytic cell showing some of the problems which may occur.

In FIG. 1, an electrolytic cell is shown to include an inner electrode 10 and an outer cup-shaped electrode 12. The inner electrode 10 may have at least a layer of an inert material to receive plating of active material 14. The outer electrode 12 may be composed of the active material. For example, the outer electrode 12 and the plating of active material 14 may be silver and the inner electrode 10 may be a base metal plated with an inert material such as gold.

The inner electrode 10 also includes an integral flange member 16 and the inner electrode 10 may be sealed across the open end of the outer electrode 14 through the use of a pair of dieletric members 18 and 20, which sandwich the flange member 16 at the open end of the outer electrode 12. The outer electrode may include, for example, a wall portion 22 to receive the sandwiched combination of the dielectric members 18 and 20 and the flange 16 and the outer end of the outer electrode 12 may be crimped over as shown at position 24 so as to provide for the seal.

In the forming of the outer cup-shaped electrode 12 it can be seen that the metal has severe bends at positions 26 and 28. At those positions 26 and 28 it is therefore possible to develop considerable strain. It is to be appreciated that strain may be present at positions other than those illustrated. An electrolyte 30 is included within the cup-shaped electrode 12 and ions from the cup-shaped electrode 12 go into and out of the electrolytic solution. The metal from which the outer electrode 12 is formed wants to go to its lowest energy configuration and as the ions go into and out of solution, crystals such as shown at positions 32 and 34 may be deposited at the areas of high strain. In addition, during the forming of the outer electrode 12 surface contaminations may cause the surface energy at different locations in the outer electrode 12 to have different energy levels. Therefore, as the ions go into and out of solution crystals tend to form so as to create the lowest possible energy configuration and crystals such as shown at position 36 may form because of surface contamination.

If the strain and surface contaminations are severe enough, these crystals may continue to form so as to ultimately build up as a needle and short out the outer electrode to the inner electrode. However, a greater problem is that upon the deplating of the active material 14 plated on the inner electrode 10, the active material 14 when deplated tends to form on the already present crystals, thereby creating needles which ultimately would short out the inner and outer electrodes. For example, a needle configuration is shown at position 38 prior to its shorting out the inner and outer electrodes. It is, therefore, obviously desirable to eliminate these strains and surface contaminations so as to eliminate these crystal formations which ultimately may cause the shorting out of the electrolytic cell.

Another problem which arises with the electrolytic cell as shown in FIG. 1 is that the active material 14 as plated on the inner electrode 10 may have a very large crystal configuration which is mechanically weak. The plating may therefore break off during the construction of the electrolytic cell, or during the deplating of the active metal these weak crystal structures may be undercut so that large sections of the active material would fall off rather than being uniformly deplated. For example, as shown in FIG. 1, a large segment 40 of the active material 14 is shown falling off of the inner electrode 10.

It is, therefore, desirable to plate the active material 14 on the electrode 10 so as to provide for uniform deplating, which uniform deplating is accurately maintained for different current levels used in the deplating. The present invention, therefore, provides for a method of plating to provide for a uniform and fine-structured layer of active material 14 on the inner electrode 10 thereby providing for accurate deplating at different current levels.

Another problem which has arisen is that after the assembly of the inner and outer electrodes into a sealed electrolytic cell, a voltage differential between the inner and outer electrodes may cause a premature plating or deplating of the active material if there is an external current path. The present invention provides for curing the electrolytic cell by elevating the temperature of the electrolytic cell for some period of time so as to create a state of equilibrium within the electrolytic cell.

Figure 2:
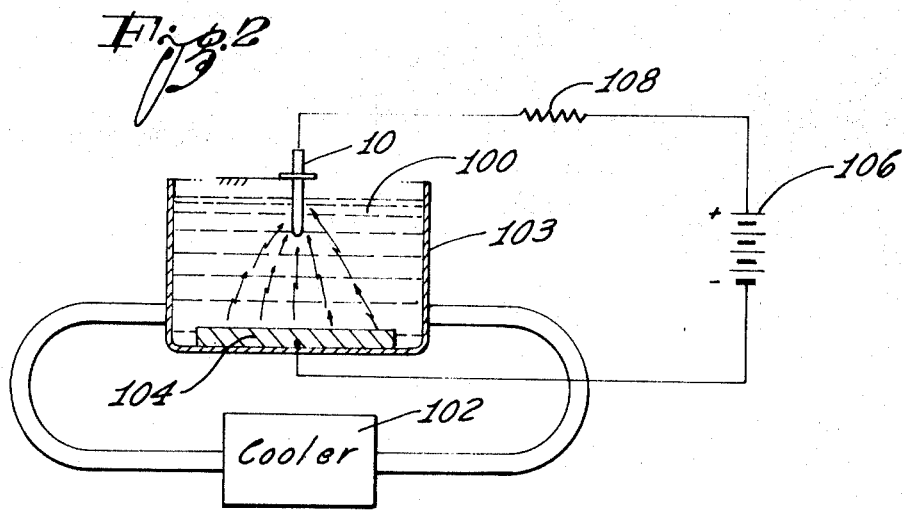
FIG. 2 illustrates a showing of a method of plating the inner electrode.

FIG. 2 illustrates a system which may be used to plate the inner electrode 10 of FIG. 1. In FIG. 2, the inner electrode 10 is partially immersed in a plating solution 100. For the plating of silver it has been determined that an extremely reliable plating solution should be waterless and a particular plating solution which has given excellent results is composed of a solution of silver nitrate in pure dimethylsulfoxide. A specific technique for preparing the silver plating solution consists of the following steps. First, 600 milliliters of dimethylsulfoxide are heated in a 1-liter beaker to 70° ±10° C. Added to the heated dimethylsulfoxide are 339.8 ± 0.5 grams of silver nitrate. The silver nitrate should be slowly added with a constant stirring of the heated dimethylsulfoxide. After the silver nitrate crystals are completely dissolved, which takes at least 30 minutes, the solution is covered and allowed to cool to room temperature. The solution may be filtered to remove any impurities and the filtered solution may then be diluted to a full 1 liter by adding pure dimethylsulfoxide. It is to be appreciated that larger quantities of the plating solution may be prepared by appropriately scaling up the values given above.

The plating solution as prepared in a manner indicated above is then cooled as shown in FIG. 2. Specifically, the plating solution may be allowed to be circulated through a cooler 102 and into a plating tank 103 so as to bring the plating solution down to a desired temperature. The temperature in the plating tank 103 should be maintained between 0° and 14° C. with an optimum value of 5° ± 5° C. The plating material is provided by a quantity of pure silver, as shown by the block 104. A voltage source 106 provides for a voltage differential between the inner electrode 10 and the plating material 104. The voltage differential creates a current flow between the plating material 104 and the inner electrode 10 through the plating solution 100 so as to provide for a plating of active material on the inner electrode 10. A resistor 108 is used to control the current flow. The use of a cold temperature during the plating provides for a very fine crystal structure of the active material on the inner electrode 10. It has been noted that as the temperature is increased and particularly as the temperature approaches room temperature, the size of the crystals increases greatly. It has been noted that if water is added to the plating solution, the size of the crystals increases. It is, therefore, desirable to use a waterless plating solution and with the plating to occur at a low temperature.

After the inner electrode 10 has been plated it may be cleaned by washing in hot water or by steam cleaning and the cleaned inner electrode 10 may then be dried, for example, by placing the inner electrode 10 in an oven at 150° C. for 1 hour. This has the effect of not only drying the inner electrode 10 but also baking out any volatile impurities.

Figure 3:
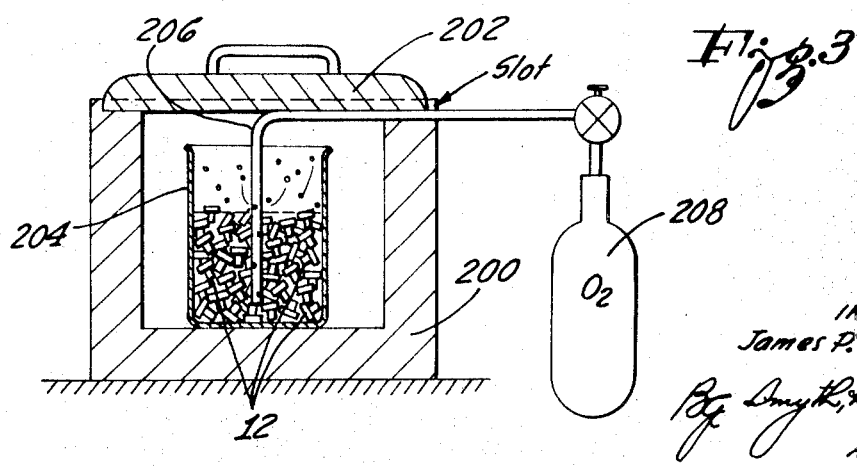
FIG. 3 illustrates a system for providing for a thermal etching of the outer electrodes.

The outer cup electrode 12 may be thermally etched using an apparatus as shown in FIG. 3. In FIG. 3 an oven such as a crucible furnace 200, and which includes a cover member 202, may be used to provide for a high temperature. A beaker such as a stainless steel beaker 204 may be filled with a plurality of outer electrodes 12. A supply of gas such as oxygen is provided to the outer electrodes 12 through a tube 206 which tube may be composed of stainless steel. Tube 206 receives its gas through a supply of oxygen 208. It is to be appreciated that other gases may be used, for example, air may be used and even a gas such as nitrogen may be used. However, it is desirable to use gas including oxygen so that during the thermal etch the oxygen will react and oxidize impurities which would then volatize off at the high temperature.

The oven 200 may be brought up to a temperature of at least 300° C. and preferably 500° ± 50° C. The beaker 204 is placed in the over and the stainless steel tube 206 is positioned in the beaker. The cup-shaped electrodes 12 may now be poured in the beaker 204 and the cover 202 may be placed so as to seal the furnace 200. It is to be appreciated that the exact procedure indicated above is not necessary. It is only important that the cup-shaped electrodes 12 be subjected to a high temperature while at the same time receiving a stream of a gas such as oxygen so as to produce a thermal etch of the cup-Shaped electrodes, which thermal etch relieves the strain in the cup-shaped electrodes and removes surface contaminants. This thermal etching may be produced for a period of time such as 30 minutes. After the heat treatment, the cup-shaped electrodes 12 are somewhat less shiny than they were originally and they are mechanically much softer.

The cup-shaped electrodes 12 as thermally etched may now be filled with the electrolyte and inner electrodes 10 which have been plated in the manner shown with reference to FIG. 2 are then sealed across the open end of the cup-shaped electrode 12. As a final step after assembly so as to create a state of equilibrium within the electrolytic cell and thereby preventing any undesired transfer of active material, the assembled electrolytic cell is raised in temperature for an extended period of time. For example, the temperature may be raised to 70° C. for a period of time such as 36 hours.

However, during the raising of the temperature, some of the electrolyte may be leached out and another method of curing which cleans at the same time is to direct steam against the electrolytic cell. The steam, of course, elevates the temperature, thereby providing for the curing to bring the cell into equilibrium and at the same time cleans the electrolytic cell and removes any of the leached electrolyte. Other advantages of the steam is that the steam itself is clean so that the steam does not bring any impurities to the structure. The steam may be used for 1 hour, so it may be seen that as the curing temperature is raised, the period of time is reduced considerably but even at the elevated temperature the period of time for the cure still extends over a considerable length of time.

The present invention, therefore, provides for the construction of an electrolytic cell, which electrolytic cell is extremely accurate in performance, does not have any false readings and does not short out prematurely during operation. Although the invention has been described with reference to a particular embodiment, it is to be appreciated that various adaptations and modifications may be made and the invention is only to be limited by the appended claims.

I claim:

1. A method of conditioning a cup electrode for use in an electrolytic cell, including the steps of
    raising the temperature of the cup electrode to relieve internal strain in the cup electrode, and
    etching the surface of the cup electrode to remove surface contamination and eliminate unequal surface energy at different locations on the cup electrode by directing a stream of gas including oxygen toward the cup electrode when the cup electrode is at the raised temperatures.

2. The method of conditioning of claim 1 wherein the temperature of the cup electrode is raised to approximately 500° ± 50° C.

3. A method of relieving strain and of surface conditioning a cup electrode for use in the production of an electrolytic cell, including the steps of
    placing the cup electrode in an oven to elevate the temperature of the cup electrode substantially above room temperature, and
    thermally etching the cup electrode by directing a stream of gas only toward the cup electrode while the cup electrode is at the elevated temperature.

4. The method of claim 3 wherein the cup electrode is elevated to a temperature of approximately 500° ± 50° C.

5. The method of claim 3 wherein the cup electrode is thermally etched using a gas containing oxygen.

* * * * *